United States Patent [19]

Russell et al.

[11] 4,168,115
[45] Sep. 18, 1979

[54] GOLF GAME PROJECTOR

[75] Inventors: Jack A. Russell, Sering Lake; Goodrich B. Pratt, Grand Haven; Anthony J. Gretzky, Muskegan, all of Mich.

[73] Assignee: Brunswick Corporation, Skokie, Ill.

[21] Appl. No.: 618,002

[22] Filed: Sep. 30, 1975

Related U.S. Application Data

[62] Division of Ser. No. 426,505, Dec. 20, 1973, Pat. No. 3,924,122, which is a division of Ser. No. 69,768, Sep. 4, 1970, Pat. No. 3,802,614.

[51] Int. Cl.² .................... G03B 21/14; A63B 69/36; G03B 41/00; G03B 7/08
[52] U.S. Cl. .................. 353/42; 273/185 A; 273/185 B; 352/141; 353/82; 354/4
[58] Field of Search ............ 353/42, 82, 101, 102; 273/185 B, 185 A; 354/4; 352/141; 355/40, 71

[56] References Cited

U.S. PATENT DOCUMENTS

| | | | |
|---|---|---|---|
| 2,894,753 | 7/1959 | Simjian | 273/185 A |
| 3,072,410 | 1/1963 | Simjian | 273/185 A |
| 3,249,007 | 5/1966 | Stauffer | 353/101 |
| 3,323,414 | 6/1967 | Ritchie et al. | 355/43 |
| 3,540,805 | 11/1970 | Mortensen | 353/82 |

Primary Examiner—Steven L. Stephan
Attorney, Agent, or Firm—John G. Heimovics

[57] ABSTRACT

An indoor golf game to display scenes representing perspective views of any one of a plurality of different locations on any one of a plurality of different holes on a golf course. The system also includes a ball spot projector for projecting a spot of light on the projected scene in a manner to simulate the trajectory and diminishing appearance of a golf ball in flight.

3 Claims, 7 Drawing Figures

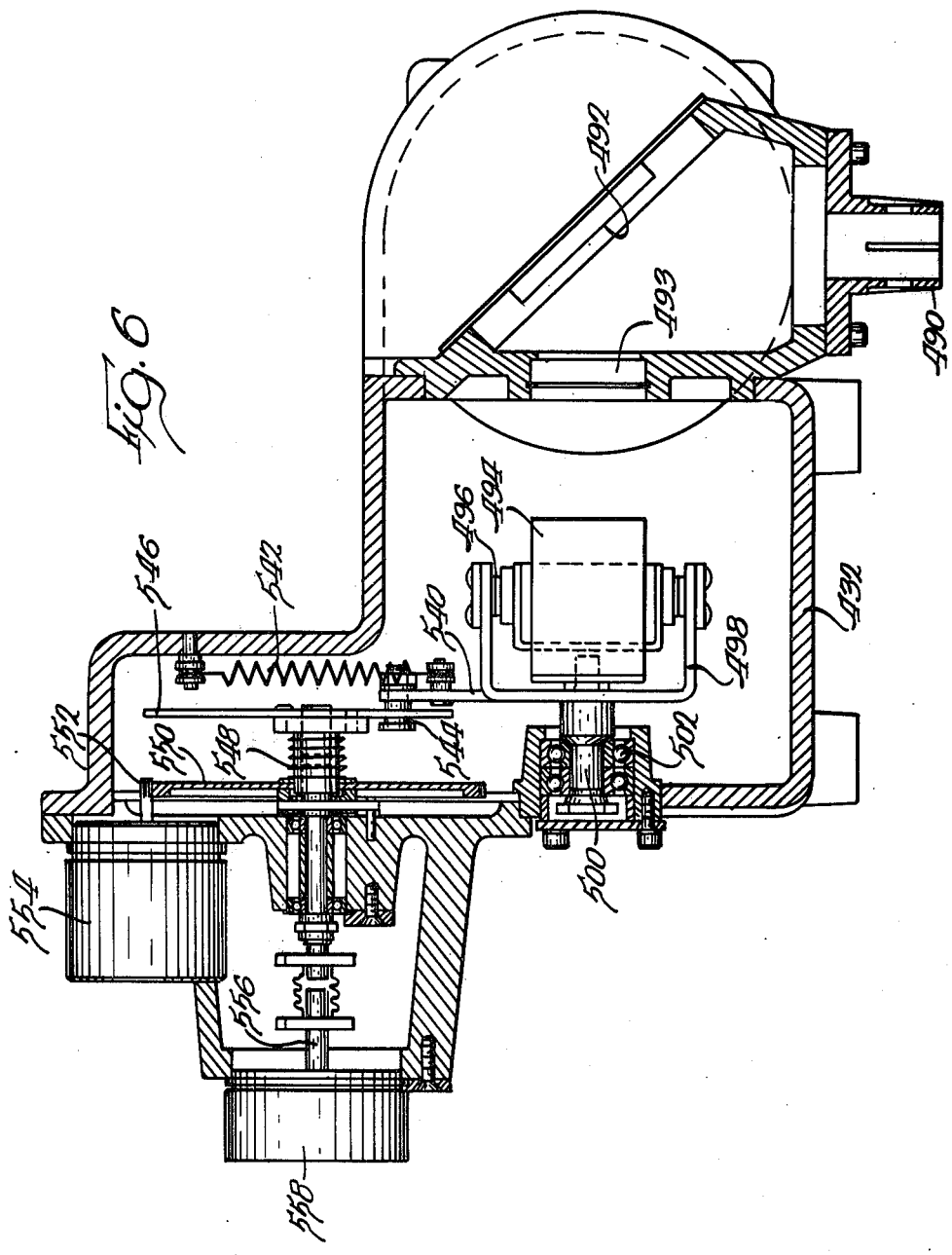

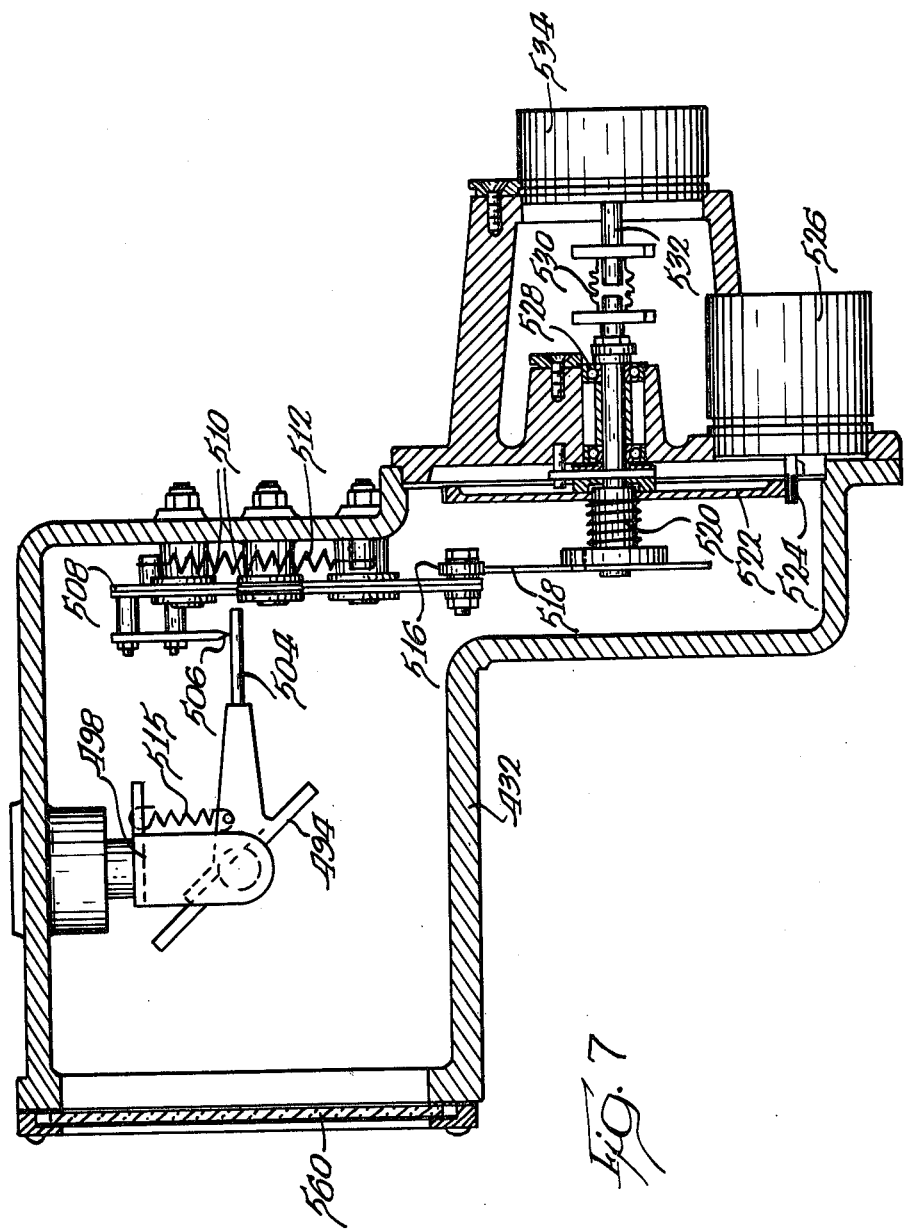

GOLF GAME PROJECTOR

CROSS REFERENCE TO CO-PENDING APPLICATION

This application is a divisional application of copending application Ser. No. 426,505, filed Dec. 20, 1973, now U.S. Pat. No. 3,924,122, which was a divisional copending application of Ser. No. 69,768, filed Sept. 4, 1970, now U.S. Pat. No. 3,802,614.

BACKGROUND OF THE INVENTION

This divisional application incorporates by reference the more complete specifications of its ancestral applications which issued as U.S. Pat. Nos. 3,802,614 and 3,924,122.

In the copending, commonly assigned application of Pratt et al, Ser. No. 574,218, filed Aug. 22, 1966 entitled "Visual Display System", there is described a scene projection system particularly suited for use in indoor golf games for selectively displaying any one of a plurality of scenes depicting a perspective view from any one of a plurality of different locations on any one of a plurality of different holes in a golf course.

The Pratt system, in comparison with this system, does not advantageously employ various parts of the projection system in concert with other elements required in an indoor golf game.

SUMMARY OF THE INVENTION

It is the principal object of this invention to provide a new and improved visual golf game display system that simulates the trajectory and diminishing appearance of a golf ball in flight. More specifically, it is an object to provide a new and improved visual display system particularly suited for use in indoor golf games, although not limited thereto.

The exemplary embodiment further takes advantage of the projector light source for generating light to operate a ball spot projector customary in indoor golf games to minimize the total number of components required in such a game and thereby improve the total reliability of the same.

Other objects and advantages will become apparent from the following specification taken in conjunction with the accompanying drawings.

DESCRIPTION OF THE DRAWINGS

FIG. 6 is a sectional view of another portion of ball spot projector assembly illustrating mechanism for altering the position of the projected spot;

FIG. 7 is a sectional view of the portion of the ball spot projector shown in FIG. 6 taken at approximately right angles to the view of FIG. 15.

DESCRIPTION OF THE PREFERRED EMBODIMENT

General Description

Disclosed herein is a visual display system for displaying any one of a plurality of frames of visual information on a film strip.

The disclosed system is intended for use in an indoor golf game having a screen upon which is displayed any one of a plurality of scenes taken from different locations on a golf course so that a golfer may hit a ball from a tee point in front of the screen in a normal fashion. As is known, such indoor golf games typically include data acquisition means which determine various parameters of a golf ball in flight hit from the tee and feed such information to a computer which then computes the theoretical trajectory that the ball would take in flight. Theoretical trajectory information is, in turn, fed to a so-called ball spot projector which, during the computation, projects a spot of light on the screen, and thus the scene thereon in such a way as to simulate the flight of the ball. Typically, a ball spot projector will reduce the size of the projected spot as the length of the trajectory increases, move the spot up or down depending upon the vertical direction of the ball at any given time in its flight and move the spot to the right or to the left dependent upon the initial direction of the ball and side spin placed thereon, if any.

In playing the game, the golfer will select a scene that corresponds to the view from a location on a particular hole from which he is to hit his next shot and such a scene will be displayed on the screen to simulate the view as it would appear to the golfer if he were on an actual golf course hitting a ball from the corresponding location.

DETAILED DESCRIPTION

Figure 1:
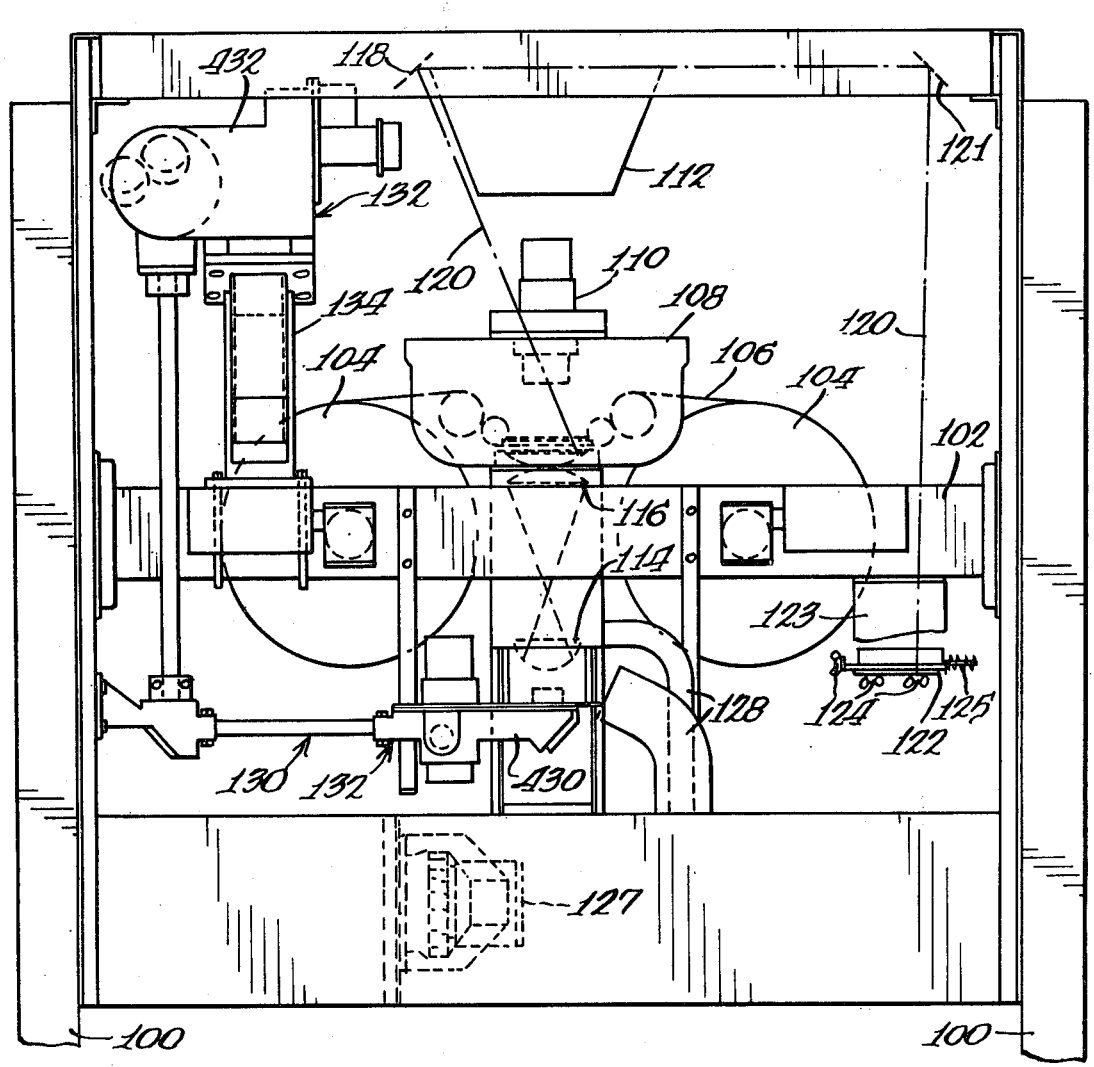
FIG. 1 is a rear elevation of a visual display system made according to the invention.

An exemplary embodiment of the projecting system made according to the invention is shown in FIG. 1 as being interposed between a pair of upright frame members 100 and mounted on a cross-member 102. The projection system includes a pair of film storage means 104 which store a film strip 106 bearing the scenes to be projected. A drive mechanism 108 is operative to shift the film strip 106 from the film storage means 104 and the same mounts a projection lens 110 which is adapted to project the image of the film strip 106 upwardly to a canted mirror 112 from which it is reflected to a viewing screen located forwardly of the structure illustrated in FIG. 1.

The projector also includes a light source having a reflector 114 and a condensing lens system 116 which condenses light from the light source and directs the same through the film strip 106 to the projection lens 110.

The system also includes a blower 127 associated with conduits 128 for conveying air for cooling purposes to the projection system.

As will be seen, the reflector 114 includes a small aperture in its center so that some light from the light source is made available to an optical light tunnel, generally designated 130 in which it is conveyed upwardly to a ball spot projector 132 mounted on the cross-member 102 by means of a frame element 134. As is well known, in indoor golf games, it is desired to provide a moving spot of light which is projected on a scene of a golf hole on a screen and which is moved in such a way as to simulate the light of the ball. The ball spot projector 132 is for this purpose and, as will be explained in greater detail hereinafter, includes means for deflecting the light in a horizontal direction, in a vertical direction, and for changing the size of the projected spot to simulate the effect of distance.

Figure 2:
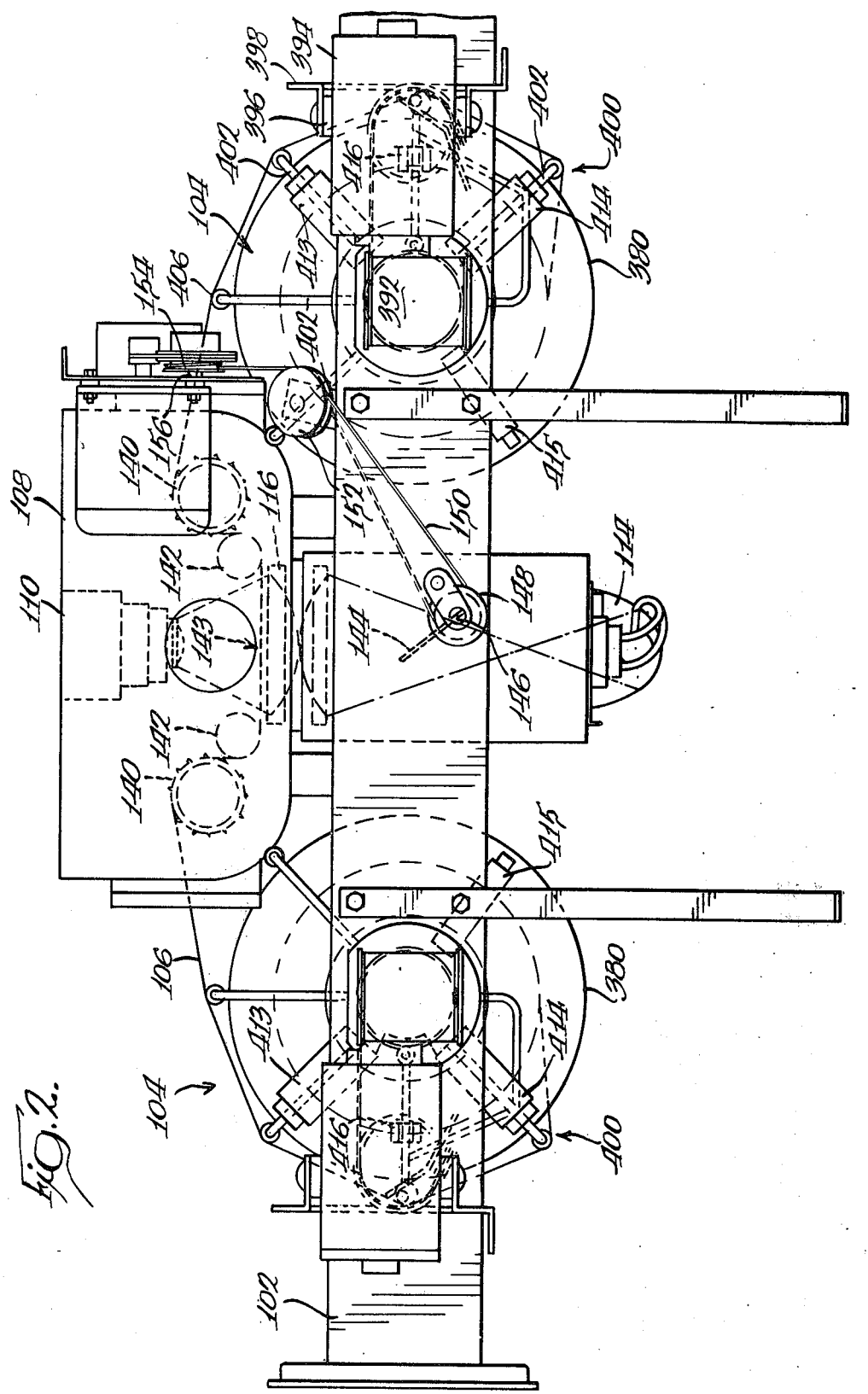
FIG. 2 is an enlarged, rear elevation of the drive mechanism of the system including film storage reels and dancer arm assemblies.
Figure 3:
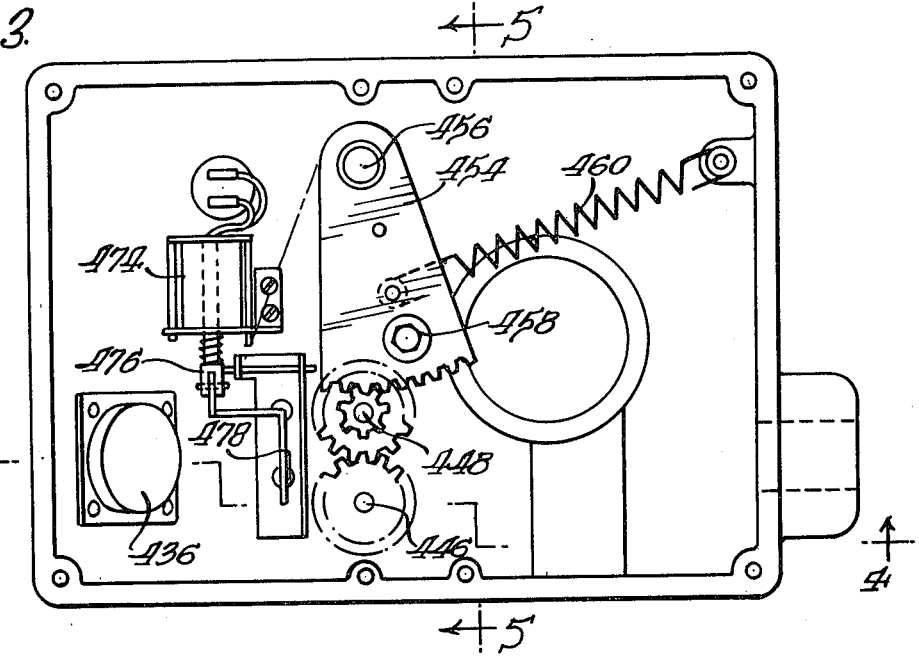
FIG. 3 illustrates a portion of a ball spot projector associated with the system and more specifically, a portion of a mechanism for changing the size of the projected spot.
Figure 4:
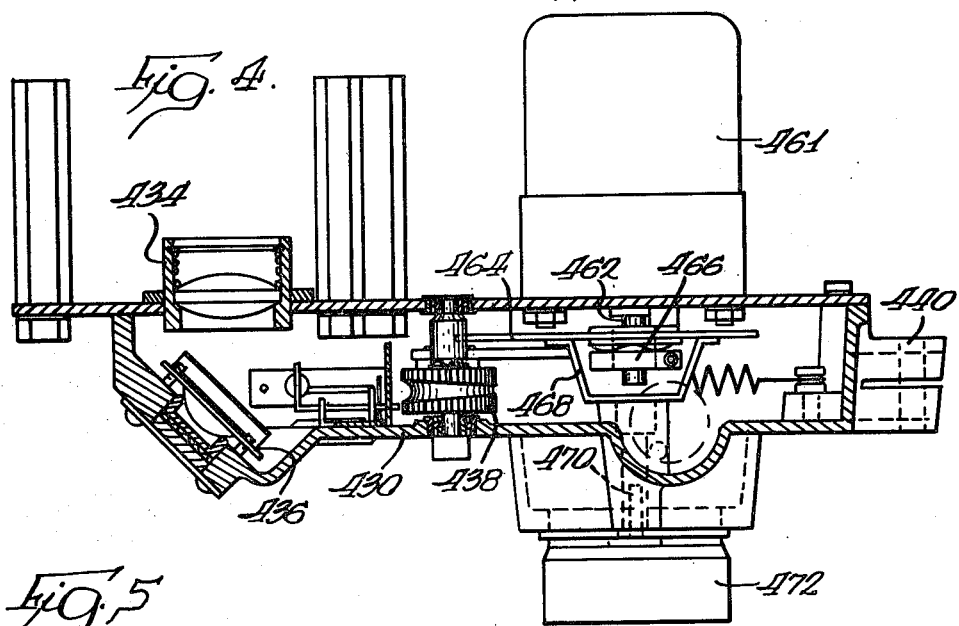
FIG. 4 is a sectional view taken approximately along the line 4—4 of FIG. 3.

Turning now to FIG. 2, the projector structure per se may be seen in greater detail. The drive mechanism 108 mounts a pair of drive sprockets 140 about which the film strip 106 is trained. Between the drive sprockets 140 are a pair of idler rollers 142 which, when a selected scene is disposed at a projection station 143 in front of the condensing lens system 116, are moved outwardly therefrom to tension the film strip 106 to preclude a so-called "oil canning" of the film strip and thus prevent distortion of the projected image.

Turning now to FIGS. 1 and 3–7, inclusive, the construction of the ball spot projector 132 will be described. As shown in FIG. 1, the ball spot projector 132 is located in two separate housings, 430 and 432 which are interconnected by the optical tunnel 130. The housing 430 is best illustrated in FIGS. 12–14 and is seen to include an optical system 434 which is adapted to underlie the reflector 114 which, it will be recalled, includes an aperture in the lower side thereof. As a result, light from the light source associated with the reflector 114 may enter the housing 430 through the optical system 434 to impinge upon an angled mirror 436. The mirror 436 rotates the beam of light approximately 90° toward an iris 438 which controls the size of the spot ultimately projected on the screen in an indoor golf game. From the iris 438, the light beam passes to the horizontal front of the light tunnel 430 via an outlet 440 in the housing 430.

Figure 5:
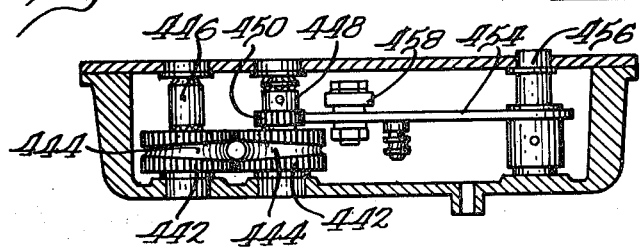
FIG. 5 is a sectional view taken approximately along the line 5—5 of FIG. 3.

As best seen in FIG. 5, the iris 438 comprises a pair of meshed gear elements 442 each having a semicircular groove cut in its peripheral surface. Each circular groove 444 further has a decreasing radius as it extends about the periphery of its corresponding gear 442 from the point of intersection of the two gears as illustrated in FIG. 14. As a result, light directed to the iris 438 will emerge therefrom in the form of a circular beam having a diameter controlled by the position of rotation of the gears 442 within the housing 430.

Each of the gears 442 is mounted on a respective shaft 446 and 448 with the shaft 448 further bearing a drive gear 450. As best seen in FIG. 12, the drive gear 450 is in mesh with a sector gear 454 mounted for rotation by a shaft 456. The sector gear 454 also mounts a rotatable cam follower roller 458 on one side thereof and is biased in a counterclockwise direction about the shaft 456 by means of a coil spring 460.

Returning to FIG. 4, the upper side of the housing 430 mounts a drive motor 461 having an output shaft 462 mounting a cam 464 in engagement with the cam follower roller 458. A friction clutch 466 is interposed between the shaft 462 and the cam 464. Depending from the underside of the cam 464 is a bracket 468 which is connected to the wiper driving shaft 470 of a feedback potentiometer 472. As is well known, the feedback potentiometer 472 may provide a signal whose potential is representative of the position of the cam 464 and thus, the position of the gears 442 and ultimately the size of the projected spot. The same is employed in a glof game in a manner heretofore known and forms no part of the instant invention.

Also within the housing 430 is a dowser assembly which may be operated by a golf game computer to preclude the projection of a spot on the screen when such is not desired. The dowser assembly is operated by a solenoid 474 having its armature 476 connected to a dowser element 478 interposed between the mirror 436 and the gears 442 when the solenoid 474 is deenergized. When a spot is to be projected on the screen, the golf game computer can drive the solenoid 474 to cause the same to withdraw the dowser 478 from its point of interposition to allow the beam of light reflected by the mirror 436 to pass to the gears 442 to permit projection of a circular spot having a diameter controlled as appropriate by the motor 461 and the feedback potentiometer 472.

Turning now to FIGS. 6 and 7, the ball spot projector elements contained within the housing 432 will be described. With specific reference to FIG. 15, the housing 432 includes an inlet 490 associated with the vertical run of the optical tunnel 130 to receive the regulated beam of light passed thereby from the housing 430. Immediately upon entry of the beam of light through the inlet 490, the same is rotated approximately 90° by a mirror 492 through a lens 493 to a movable mirror 494. The movable mirror 494 is mounted for movement about two mutually perpendicular axes. This is accomplished by rotatably mounting the mirror 494 by means of a shaft 496 in a yoke 498 having its bight pivotally mounted by bearings 502 mounted in the housing 432. Accordingly, when the mirror 494 is rotated about the axis provided by shaft 496, it may move in one direction and when the entire assembly is rotated about the axis provided by the shaft 500 in the bearings 502, the mirror 494 is moved in a second direction.

With reference to FIG. 7, the means by which movement of the mirror 494 about the axis of shaft 496 is accomplished will be described. Extending from the rear side of the mirror 494 is a circular post 504 which may be engaged by an elongated knife edge 506 mounted on a slide 508. Suitable rollers 510 mount the slide 508 for reciprocating, linear motion within the housing 432. The slide 508 is biased by means of a spring 512 in a downward direction as viewed in FIG. 16 while a spring 514 biases the mirror 494 such that the circular post 504 tends to move in a counterclockwise direction. As a result, engagement of the post 504 with the knife edge is assured.

The lowermost end of the slide 508 has a rotatable cam follower roller 516 mounted thereon. The cam follower roller 516 is in engagement with a cam 518 mounted on a shaft 520 for movement therewith. The shaft 520 also mounts an enlarged gear 522 which engages the gear surface 524 on the output shaft of a drive motor 526. Thus, when the drive motor 526 is energized, the cam 518 will be rotated to control the position of the slide 508 and thus the angular position of the mirror 494 about the axis provided by shaft 496. The shaft 520 is journaled by means of bearings 528 in the housing and is connected via a coupling 530 to the wiper control shaft 532 of a feedback potentiometer 534. In a manner known in the art, the feedback potentiometer 534 works in concert with the motor 526 to control the angular position of the mirror 594 and thus, the position of the projected spot on the screen for one direction of movement.

Returning now to FIG. 6, the means by which the angular position of the mirror 494 with respect to the axis provided by shaft 500 will be seen. Extending from the yoke 498 is an arm 540 which is biased by a spring 542 in a direction out of the paper as viewed in FIG. 15.

At the uppermost extremity of the arm 540 there is a rotatable cam follower roller 544 which is biased by the spring 542 into engagement with a cam 546 mounted on a shaft 548. The shaft 548 also mounts a gear 550 in engagement with a gear surface 552 on the output shaft of a drive motor 554 and is connected to the wiper control shaft 556 of the feedback potentiometer 558 in the same manner described previously with regard to the shaft 520. It will therefore be apparent that energization of the motor 554 will cause a corresponding rotation of the cam 546 and, due to the bias of the spring 542, the arm 540 and thus the mirror 494 will follow the cam surface 496 about the axis defined by shaft 500 to control the position of the projected spot on the screen in a second direction transverse to the first mentioned direction above.

The housing 432 is completed by a transparent window 560 mounted forwardly of the mirror 494 from which the projected spot of light as reflected by the mirror 494 may emerge to be projected on the scene bearing screen employed in an indoor golf game.

We claim:

1. In a golf game having a screen on which scenes from various locations on a golf course hole may be displayed along with a visual representation of the flight of a golf ball, a modular projection means comprising:
   (1) a scene projector including storage means for storing film including a plurality of scenes depicting the view from various locations on a golf course hole;
   (2) a projection station including a light source at which a selected scene may be disposed for projection by the light source on a screen;
   (3) selection means for selecting a desired one of the scenes and locating the same at the projection station;
   (4) a ball flight display unit including optical means associated with said light source for generating a spot of light, the optical means includes a pair of elements having a surface of revolution each having a groove of semicircular cross section in said surface of revolution with the cross section of each groove varying in radius along its length and means mounting said elements for common rotation about spaced axes and in contact with each other so that said grooves define said spot of light and so the size of the spot of light may be varied by rotating said elements; and,
   (5) means adapted to be controlled by a computer for projecting said spot of light to a desired location on the screen.

2. The modular projection means of claim 1 wherein said light source includes light generating means, and a reflector partially surrounding said light generating means for reflecting light to a scene at said projecting station, said reflector including a small light transmitting portion; said optical means being operatively associated with said light transmitting portion.

3. The modular projecting means of claim 1 wherein said spot projecting means comprises a mirror mounted for universal movement and means for moving said mirror about two differing axes.

* * * * *